(12) United States Patent
Liao et al.

(10) Patent No.: US 8,111,291 B2
(45) Date of Patent: Feb. 7, 2012

(54) IMAGE CAPTURE METHODS AND SYSTEMS COMPENSATED TO HAVE AN OPTIMIZED TOTAL GAIN

(75) Inventors: Kun-Chi Liao, Taichung (TW); Yi-Chang Lin, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 597 days.

(21) Appl. No.: 12/248,230

(22) Filed: Oct. 9, 2008

(65) Prior Publication Data

US 2009/0185043 A1 Jul. 23, 2009

(30) Foreign Application Priority Data

Jan. 17, 2008 (TW) .............................. 97101783 A

(51) Int. Cl.
*H04N 17/00* (2006.01)
*H04N 5/20* (2006.01)

(52) U.S. Cl. ........................................ 348/187; 348/255
(58) Field of Classification Search .................. 348/187, 348/208.99, 208.6, 222.1, 255
See application file for complete search history.

(56) References Cited

U.S. PATENT DOCUMENTS

| | | | | |
|---|---|---|---|---|
| 6,628,329 B1* | 9/2003 | Kelly et al. | ... | 348/252 |
| 2006/0237755 A1* | 10/2006 | Duesman et al. | ... | 257/291 |
| 2009/0207276 A1* | 8/2009 | Kawasaki | ... | 348/229.1 |
| 2010/0214438 A1* | 8/2010 | Hayashi et al. | ... | 348/229.1 |

* cited by examiner

*Primary Examiner* — Timothy J Henn
(74) *Attorney, Agent, or Firm* — Thomas|Kayden

(57) ABSTRACT

Image capture systems capable of ensuring clear images are provided, in which an image capture module senses at least one image, and an operational module performs a compensation to the image capture system according to a modulation transfer function (MTF) value corresponding to the image, such that the image capture system can be operated under an optimized total gain thereby ensuring clear images.

16 Claims, 5 Drawing Sheets

IMAGE CAPTURE METHODS AND SYSTEMS COMPENSATED TO HAVE AN OPTIMIZED TOTAL GAIN

CROSS REFERENCE TO RELATED APPLICATIONS

This Application also claims priority of Taiwan Patent Application No. 097101783, filed on Jan. 17, 2008, the entirety of which is incorporated by reference herein.

BACKGROUND OF THE INVENTION

1. Field of the Invention

The invention relates to an image capture method, and more particularly, to image capture methods capable of ensuring clear images and image capture systems using the same.

2. Description of the Related Art

Due to ease of use, review and processing captured images in devices such as computers, digital cameras have become a popularized electronic device.

However, vibration occurs in all cameras, particularly in digital cameras which are light and have thin volumes. Since it is difficult to hold a camera stably by hand, image blur may occur if the cameras move too much before capturing of images. Thus, anti-vibration mechanisms are always provided in digital cameras.

BRIEF SUMMARY OF THE INVENTION

Embodiments of an image capture method for an image capture system are provided, in which a compensation is performed to the image capture system according to modulation transfer function (MTF) value(s) corresponding to image(s), such that the image capture system is operated under an optimized total gain, and subsequent image(s) is/are captured under the optimized total gain.

The invention also provides an embodiment of an image capture system, in which an image capture module senses at least one image, and an operational module performs a compensation to the image capture system according to a modulation transfer function (MTF) value corresponding to the image.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Certain terms are used throughout the description and claims to refer to particular system components. As one skilled in the art will appreciate, consumer electronic equipment manufacturers may refer to a component by different names. This document does not intend to distinguish between components that differ in name but not function.

Because image clarity is affected by firmware/hardware parameters of an image capture system and modulation transfer function values (MTF) corresponding to images can be used to determine whether the images are clear, the MTF values can be used to determine compensation result of the firmware/hardware parameters, such that processing flow in the firmware and signal processing module in the hardware can be operated under an optimized parameter.

Figure 1:
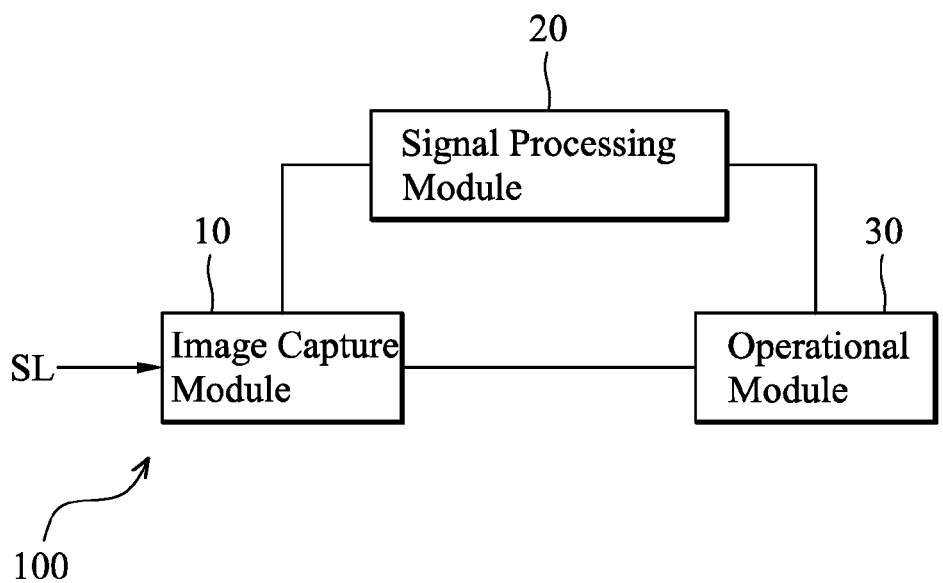
FIG. 1 shows a hardware environment diagram of an image capture system according to the invention.

FIG. 1 shows a hardware environment diagram of an image capture system according to the invention. As shown, the image capture system 100 comprises an image capture module 10, a signal processing module 20 and an operational module 30. For example, the image capture module 10 at least comprises a lens and an image sensor, in which the image sensor can be a charge-coupled device (CCD) or a complementary metal-oxide-semiconductor (CMOS) for sensing and capturing images. In the embodiments, the image capture module 10 can be used to capture still images and/or dynamic images. For example, the image capture module 10 receives external light beams by the lens and receives light signals by the image sensor to generate still images and/or dynamic images.

The operational module 30 performs an image spectrums analysis to images sensed by the image capture module 10 to obtain MTF values corresponding to the sensed images, thereby adjusting the total gain value of the image capture system 100.

The signal processing module 20 at least comprises detectors, amplifiers, ADCs, drivers and the like to receive image signals from the image capture module 10 and detection signals from the detector, and then the signal processing module 20 executes a corresponding operation according to instruction(s) form the operational module 30. For example, the detectors are used to detect variations in movement or inclination of the image sensor and lens and generate a corresponding result signal. The amplifiers amplify the result signals from the detectors and the ADCs, and convert the amplified signals output from the amplifiers into digital signals, and the drivers adjust relative position between the lens and the image sensor according to instruction(s) from the operational module 30.

The operational module 30 determines one image with a maximum MTF value from the images sensed by the image capture module 10, and sets a total gain corresponding to the image with the maximum MTF value to serve as an optimized total gain, such that the image capture system 100 is operated under the optimized total gain. When the image capture system 100 is adjusted to be operated under the optimized total gain, the internal components (i.e., detector, amplifiers, ADCs, drivers and the like) of the signal processing module 20 automatically adjust their corresponding gains, such that the signal processing module 20 can be operated at an optimized image capture state.

In embodiments of the invention, the operational module 30 can be a microprocessor, a microcontroller or a control unit, but is not limited thereto. In addition, the image capture system 100 can be a digital camera, a digital video camera, a combination thereof, or consumer electronic devices capable of capturing pictures and recording video, such as a mobile phone or a personal digital assistant (PDA), but is not limited thereto.

Figure 2:
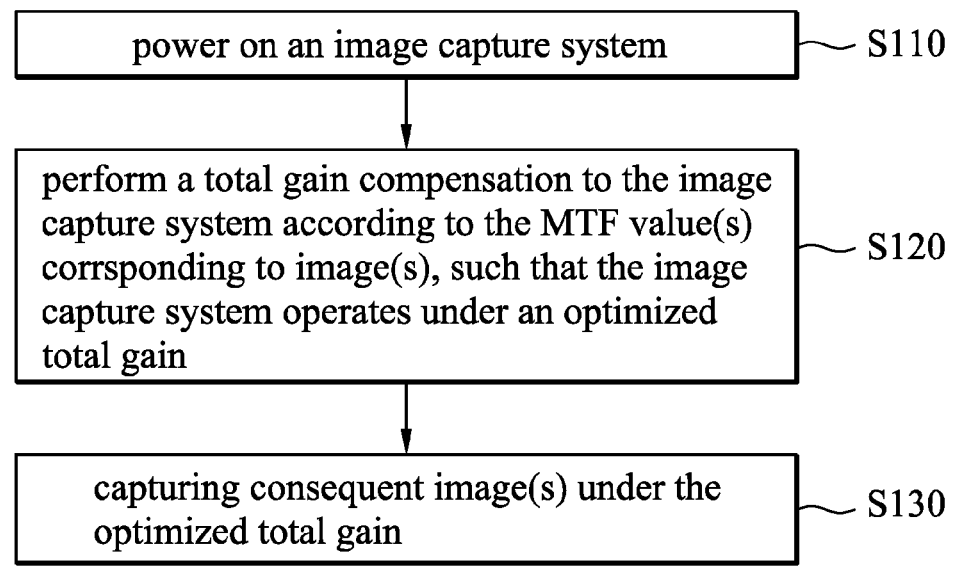
FIG. 2 shows a processing flowchart of capturing of images according to the embodiments of the invention.

The invention also provides an embodiment of an image capture method. FIG. 2 shows a processing flowchart of capturing of images according to the embodiments of the invention.

In step S110, the image capture system 100 is powered on. Then, in step S120, the operational module 30 performs a compensation to the image capture system 100 according to modulation transfer function (MTF) value(s) corresponding to the sensed image(s), such that the image capture system 100 can be operated under an optimized total gain to obtain optimized performance. For example, the operational module 30 enables the image sensor in the image capture module 10 to expose, and then the image sensor outputs the sensed image(s) to the operational module 30. At this time, the operational module 30 estimates the MTF value(s) corresponding to the sensed image(s), such that signal processing module accordingly performs image clarity calibration. Finally, in step S130, the signal processing module 20 sets the image capture system 100 to operate under an optimized total gain thereby capturing still images and/or dynamitic image.

It should be noted that the sensed image(s) in step S120 can be image(s) that is/are sensed by the image capture module 10 before the operational module 30 asserts a capture instruction after the image capture system 100 is powered on, rather than capturing image(s) after the operational module 30 asserts the capture instruction. Namely, the step S120 is accomplished before a user presses the shutter button.

Figure 3:
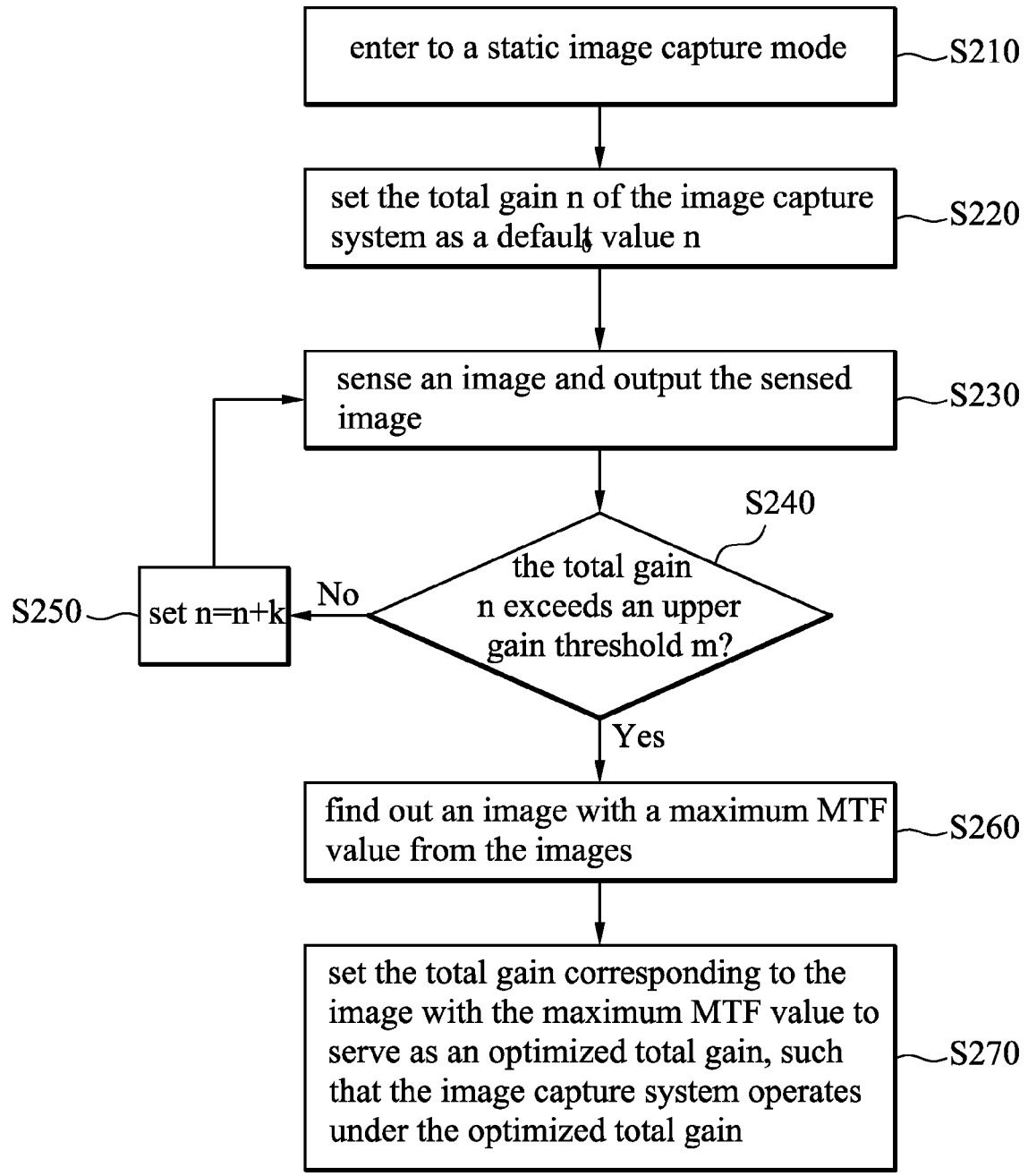
FIG. 3 shows an embodiment for performing the compensation according to the sensed image(s)

FIG. 3 shows an embodiment for performing the compensation according to the sensed image(s) in the step S120.

In step S210, the image capture system 100 enters a still image capture mode. For example, the image capture system 100 can have a plurality of image capture modes, such as a still image capture mode and/or a dynamic image capture mode, but is not limited thereto.

Then, in step S220, the operational module 30 sets the total gain n of the image capture system 100 as a default value $n_0$ (i.e., a lower gain threshold). For example, after the operational module 30 sets the total gain of the image capture system 100, the internal components, such as detectors, amplifiers, ADCs, drivers and the like, of the signal processing module 20 automatically set their gains. Namely, the total gain is an equivalent gain of the image capture system 100.

Next, in step S230, the image capture module 10 senses an image and outputs the sensed image. In step S240, the operational module 30 determines whether the total gain n exceeds an upper gain threshold m. For example, m can be an upper threshold of the total gain n, and m can be between 80 and 100. Step S250 is then executed, when the total gain is smaller than the upper gain threshold m. In step S250, the operational module 30 sets n as n+k, meaning that the total gain n is increased by k, in which k can be a real number exceeding zero, and the method returns to step S230. For example, the operational module 30 adds k to n, and enables the image capture module 10 to sense an image again and output the sensed image. Namely, steps S230~S250 would be executed repeatedly until the total gain n exceeds or is equal to the upper gain threshold m, such that the image capture module 10 can sense images under different total gains and output the sensed images to the operational module 30.

On the contrary, step S260 is executed when the total gain n exceeds or is equal to the upper gain threshold m. In step S260, the operational module 30 determines an image with a maximum MTF value from the images sensed under different total gains.

Then, in step S270, the operational module 30 sets the total gain corresponding to the image with the maximum MTF value to serve as an optimized total gain, such that the image capture system 100 operates under the optimized total gain.

In this embodiment, the operational module 30 sets the image capture system 100 to sense images under the default value $n_0$ and the upper gain threshold m of the total gain, determines the image with the maximum MTF value from the sensed images, and sets the image capture system 100 to operate under the total gain corresponding to the image with the maximum MTF value, thereby obtaining the clearest images.

Figure 4:
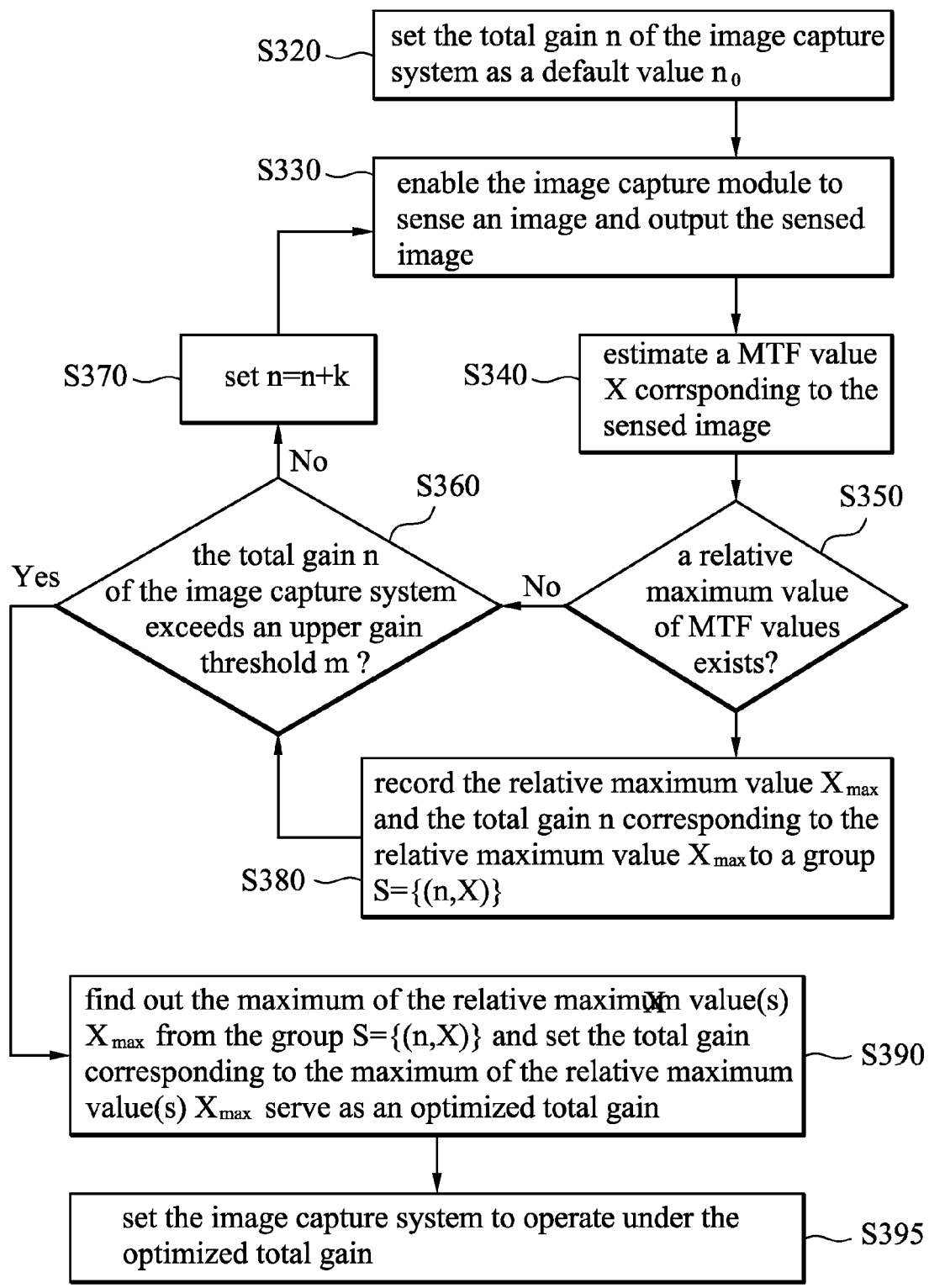
FIG. 4 shows another embodiment for performing the compensation according to the sensed image(s)

FIG. 4 shows another embodiment for performing the compensation according to the sensed image(s) in the step S120.

In step S320, the operational module 30 sets the total gain n of the image capture system 100 as a default value $n_0$. Then, in step S330, the operational module 30 enables the image capture module 10 to sense an image and output the sensed image. In step S340, the operational module 30 estimates an MTF value X corresponding to the sensed image.

Next, in step S350, the operational module 30 determines whether a relative maximum value of MTF values exists according to the estimated MTF value. If so, step S380 is executed, and step S360 is executed if a relative maximum value of MTF values does not exist. For example, the operational module 30 compares the last estimated MTF value $X_i$ with the previous MTF values $X_{i-1}$ and $X_{i-2}$. If the MTF value $X_{i-1}$ exceeds both of the MTF values $X_i$ and $X_{i-2}$, the operational module 30 defines the MTF value $X_{i-1}$ to be a relative maximum value $X_{max}$ of the MTF values. If not, the operational module 30 determines that there is no relative maximum value of MTF values.

In step S360, the operational module 30 determines whether the total gain n of the image capture system 100 exceeds an upper gain threshold m. Step S370 is then executed when the total gain n is smaller than the upper gain threshold m, and step 390 is executed when the total gain n exceeds or is equal to the upper gain threshold m.

In step S370, the operational module 30 sets the total gain n as n+k (i.e. adds k to n) and the method returns to the step S330.

In step S380, the operational records the relative maximum value $X_{max}$ and the total gain n corresponding to the relative maximum value $X_{max}$ to a group S={(n,X)}, and the method returns to the step S360.

Namely, the steps S330~380 would be executed repeatedly until the total gain n is equal to or exceeds the upper gain threshold m, such that the operational module 30 records all of the relative maximum value(s) $X_{max}$ and the total gain(s) corresponding to the relative maximum value(s) $X_{max}$ to the group S={(n,X)}.

Then, in step S390, the operational module 30 determines the maximum of the relative maximum value(s) $X_{max}$ from the group S={(n,X)}, and sets the total gain corresponding to the maximum of the relative maximum value(s) $X_{max}$ to serve as an optimized total gain.

Next, in step S395, the operational module 30 sets the image capture system 100 to operate under the optimized total gain.

In this embodiment, the operational module 30 sets the image capture system 100 to sense images under the default value $n_0$ and the upper gain threshold m of the total gain, estimates MTF values corresponding to the sensed images, determines the relative maximum value(s) $X_{max}$ from the MTF values, and records the relative maximum value(s) $X_{max}$ and total gain(s) corresponding to the relative maximum value(s) $X_{max}$ to the group S={(n,X)}. Then, the operational module 30 determines the maximum of the relative maximum value(s) $X_{max}$ from the group $S=\{(n,X)\}$, such that the image capture system 100 operates under the total gain corresponding to the maximum of the relative maximum value(s) $X_{max}$, thereby obtaining the clearest images.

Figure 5:
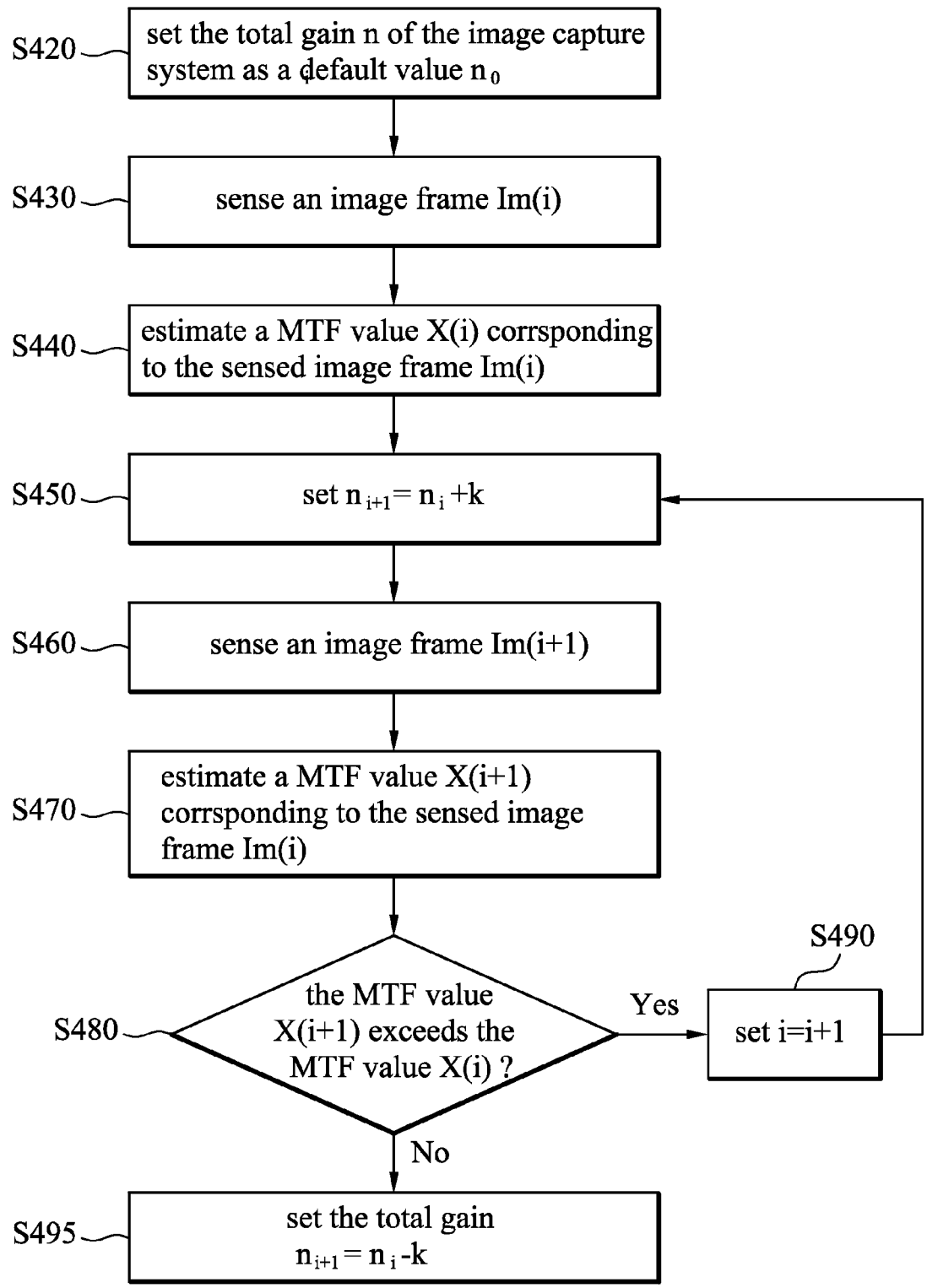
FIG. 5 shows another embodiment for performing the compensation according to the sensed image(s)

FIG. 5 shows another embodiment for performing the compensation according to the sensed image(s) in the step S120.

In step S420, the operational module 30 sets the total gain n of the image capture system 100 as a default value $n_0$. Then, in step S430, the operational module 30 enables the image capture module 10 to sense an image frame Im(i), and output the sensed image frame Im(i). In step S440, the operational module 30 estimates an MTF value X(i) corresponding to the sensed image frame Im(i).

Next, in step S450, the operational module 30 sets the total gain n as n+k (i.e. adds k to n). In step S460, the operational module 30 enables the image capture module 10 to sense an image frame Im(i+1), and in step S470, the operational module 30 estimates an MTF value X(i+1) corresponding to the sensed image frame Im(i+1).

In step S480, the operational module 30 compares the MTF value X(i) corresponding to the sensed image frame Im(i) with the MTF value X(i+1) corresponding to the sensed image frame Im(i+1). Step S490 is then executed if the MTF value X(i+1) exceeds the MTF value X(i), and step S495 is executed if the MTF value X(i+1) is smaller than the MTF value X(i).

In step S490, the operational module 30 sets i as i+1 (i.e. adds 1 to i), and the method returns to step S450. In step S495, the operational module 30 sets the total gain $n_{i+1}$ as $n_i-k$ (i.e. subtracts k from $n_i$). Namely, step S480~490 are repeatedly executed until the MTF value X(i+1) is smaller than the MTF value X(i). Subsequently, the operational module 30 determines the maximum of the MFT values and the total gain corresponding to the found maximum MTF value, and uses the total gain corresponding to the determined maximum MTF value to serve as an optimized total gain.

In this embodiment, the operational module 30 adjusts the total gain of the image capture system 100 if the MTF value corresponding to the last sensed image frame exceeds that corresponding to a previous sensed image frame, and, if not, the operational module 30 maintains it at the previous total gain. Thus, the operational module 30 determines an optimized total gain according to the MTF values corresponding to the sensed image frames during an image sensing period, thereby obtaining the clearest images.

Figure 6:
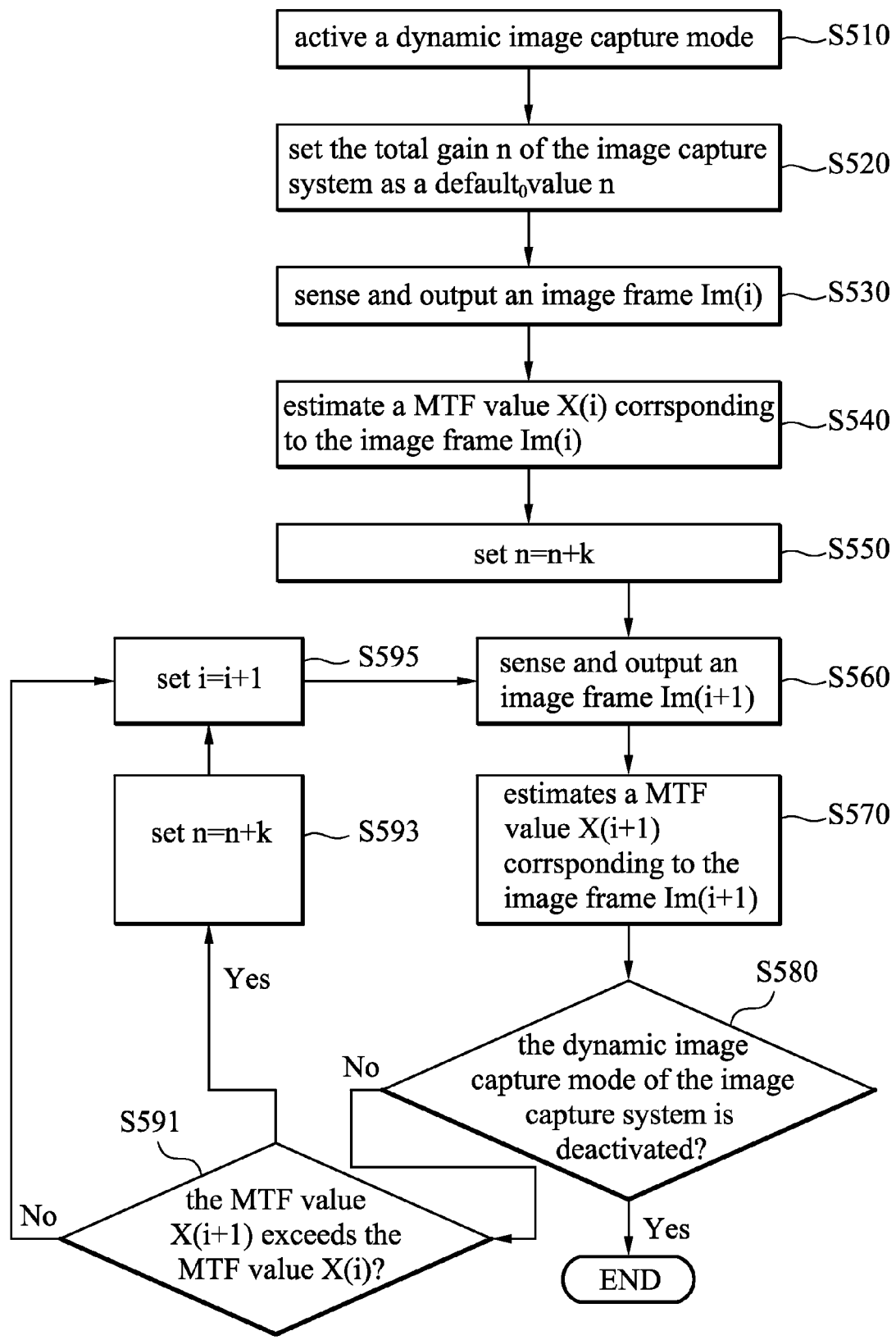
FIG. 6 shows another embodiment for performing the compensation according to the sensed image(s).

FIG. 6 shows another embodiment for performing the compensation according to the sensed image(s) in the step S120.

In step S510, a dynamic image capture mode of the image capture system 100 is activated. Then, in step S520, the operational module 30 sets the total gain n of the image capture system 100 as a default value $n_0$. In step S530, the operational module 30 enables the image capture module 10 to sense images and output an image frame Im(i). In step S540, the operational module 30 estimates an MTF value X(i) corresponding to the image frame Im(i).

In step S550, the operational module 30 sets n as n+k, meaning the total gain n is increased by k. Then, in step S560, the operational module 30 enables the image capture module 10 to sense images and output an image frame Im(i+1). In step S570, the operational module 30 estimates an MTF value X(i+1) corresponding to the image frame Im(i+1).

In step S580, the operational module 30 detects whether the dynamic image capture mode of the image capture system 100 is deactivated. Step S591 is then executed if the dynamic image capture function is not deactivated. On the contrary, the method is ended if the dynamic image capture function is deactivated.

In step S591, the operational module 30 compares the MTF value X(i) of the image frame Im(i) with the MTF value X(i+1) corresponding to the image frame Im(i+1). Step S593 is then executed if the MTF value X(i+1) exceeds the MTF value X(i+1), such that the operational module 30 sets n as n+k, meaning that the total gain is increased by k. On the contrary, step S565 is executed if the MTF value X(i+1) does not exceed the MTF value X(i+1), such that the operational module 30 sets i as i+1 and the method returns to step S560. Namely, steps S560~595 are repeatedly executed until the dynamic image capture mode of the image capture system 100 is deactivated.

In this embodiment, the operational module 30 adjusts the total gain of the image capture system 100 if the MTF value corresponding to the last sensed image frame exceeds that corresponding to a previously sensed image frame, and, if not, the operational module 30 maintains it at the previous total gain. Thus, the operational module 30 determines an optimized total gain according to the MTF values corresponding to the sensed image frames during an image sensing period, thereby obtaining the clearest images.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. An image capture method for an image capture system, comprising:
   (a) performing a compensation to adjust a total gain of the image capture system to an optimized total gain according to modulation transfer function (MTF) value(s) of image(s), such that the image capture system is operated under the optimized total gain; and
   (b) capturing subsequent image(s) under the optimized total gain,
   wherein the step (a) further comprises the steps of:
   setting different total gains to the image capture system to sense the images;
   estimating the MTF values corresponding to the images;
   obtaining a maximum of the MTF values; and
   setting the total gain corresponding to the maximum MTF value to serve as the optimized total gain.

2. An image capture method for an image capture system, comprising:
   (a) performing a compensation to adjust a total gain of the image capture system to an optimized total gain according to modulation transfer function (MTF) value(s) of imaqe(s), such that the image capture system is operated under the optimized total gain; and
   (b) capturing subsequent image(s) under the optimized total gain,
   wherein the step (a) further comprises the steps of:
   (a1) sensing the image under a total gain;
   (a2) estimating the MTF value corresponding to the image;
   (a3) storing the MTF value and the total gain corresponding to the MTF value to a group when the MTF value is a relatively maximum value;
   (a4) adjusting the total gain and executing the steps (a1) to (a3) until the total gain exceeds a gain threshold;
   (a5) obtaining a maximum of the MTF values from the group; and (a6) setting the total gain corresponding to the maximum MTF value to serve as the optimized total gain.

3. An image capture method for an image capture system, comprising:
(a) performing a compensation to adjust a total gain of the image capture system to an optimized total gain according to modulation transfer function (MTF) value(s) of image(s), such that the image capture system is operated under the optimized total gain; and
(b) capturing subsequent image(s) under the optimized total gain,
wherein the step (a) further comprises the steps of:
(a1) sensing a first image under a first total gain and estimating a first MTF value of the first image;
(a2) sensing a second image under a second total gain and estimating a second MTF value of the second image;
(a3) comparing the first MTF value with the second MTF value; and
(a4) setting the second total gain to serve as the optimized total gain when the second MTF value exceeds the first MTF value.

4. The image capture method as claimed in claim 3, wherein the step (a4) further comprises a step of:
(a5) setting the first total gain to serve as the optimized total gain when the second MTF value is equal to or smaller than the first MTF value.

5. An image capture method for an image capture system, comprising:
(a) performing a compensation to adjust a total gain of the image capture system to an optimized total gain according to modulation transfer function (MTF) value(s) of image(s), such that the image capture system is operated under the optimized total gain; and
(b) capturing subsequent image(s) under the optimized total gain,
wherein the step (a) comprises the steps of:
(a1) sensing a first image frame under a first total gain and estimating a first MTF value of the first image frame;
(a2) sensing a second image frame under a second total gain and estimating a second MTF value of the second image frame;
(a3) comparing the first MTF value with the second MTF value; and
(a4) sensing a third image frame under the second total gain if the second MTF value exceeds the first MTF value, and if not, sensing the third image frame under the first total gain.

6. The image capture method as claimed in claim 5, wherein the steps (a)~(b) and (a1)~(a4) are executed before capturing still image(s).

7. The image capture method as claimed in claim 5, wherein the steps (a)~(b) and (a1)~(a4) are executed during dynamic image sensing.

8. The image capture method as claimed in claim 7, wherein the step (a4) further comprises:
executing the steps (a1)~(a4) until dynamic image sensing has ended.

9. An image capture system, comprising:
an image capture module sensing at least one image; and
an operational module performing a compensation to adjust a total gain of the image capture system to an optimized total gain according to a modulation transfer function (MTF) value of the image,
wherein the image capture module sets different total gains to the image capture system to sense the images, and the operational module estimates the MTF values of the images, obtains a maximum of the MTF values, and sets the total gain corresponding to the maximum MTF value to serve as the optimized total gain.

10. An image capture system, comprising:
an image capture module sensing at least one image; and
an operational module performing a compensation to adjust a total gain of the image capture system to an optimized total gain according to a modulation transfer function (MTF) value of the image,
wherein the operational module adjusts the total gain to be between an upper gain threshold and a lower gain threshold, sets the image capture system to correspondingly sense the images, estimates MTF values of the images, determines relatively maximum value(s) of the MTF values, and stores the relatively maximum value(s) and total gain(s) corresponding to the relatively maximum value(s) to a set, obtains a maximum of the relatively maximum value(s) from the set, and sets the total gain corresponding to the maximum of the relatively maximum value(s) to serve as the optimized total gain.

11. An image capture system, comprising:
an image capture module sensing at least one image; and
an operational module performing a compensation to adjust a total gain of the image capture system to an optimized total gain according to a modulation transfer function (MTF) value of the image,
wherein the image capture system senses first and second images under first and second total gains respectively, and the operational module estimates a first MFT value of the first image and a second MFT value of the second image, compares the first MTF value with the second MFT value, and sets the second total gain to serve as the optimized total gain when the second total gain exceeds the first total gain.

12. The image capture system as claimed in claim 11, wherein the operational module sets the first total gain to serve as the optimized total gain when the second gain is equal to or smaller than the second total gain.

13. An image capture system, comprising:
an image capture module sensing at least one image; and
an operational module performing a compensation to adjust a total gain of the image capture system to an optimized total gain according to a modulation transfer function (MTF) value of the image,
wherein, during an image capture procedure, the operational module senses first and second image frames under first and second total gains, respectively, estimates first and second MTF values of the first and second image frames, determines whether the first MTF value exceeds the second MTF value, senses a third image frame under the second total gain if the first MTF value exceeds the second MTF value, and, if not, senses the third image frame under the first total gain.

14. The image capture system as claimed in claim 13, wherein the image capture system executes the image capture procedure before capturing still image(s).

15. The image capture system as claimed in claim 13, wherein the image capture procedure is a dynamic image capture procedure.

16. The image capture system as claimed in claim 15, wherein the operational module continuously estimates MTF values of image frames from the image capture module, and adjusts the total gain of the image capture system accordingly until the image capture module stops sensing the dynamic image capture.

* * * * *